United States Patent [19]
Brown

[11] 3,817,380
[45] June 18, 1974

[54] SAFETY OIL STRAINER
[75] Inventor: Ralph D. Brown, Springfield, Pa.
[73] Assignee: Westinghouse Electric Corporation, Pittsburgh, Pa.
[22] Filed: Jan. 16, 1973
[21] Appl. No.: 324,053

[52] U.S. Cl. ................................ 210/131, 210/223
[51] Int. Cl. .......................................... B01d 27/10
[58] Field of Search ........... 210/131, 132, 130, 223, 210/398, 452, 453, 448, 222; 137/540, 540.19; 55/309, 311, 312, 313; 251/65

[56] References Cited
UNITED STATES PATENTS

| | | | |
|---|---|---|---|
| 3,341,019 | 9/1967 | Florkowski | 210/132 |
| 3,468,420 | 9/1969 | Rosaen | 210/223 X |
| 3,583,431 | 6/1971 | Diel | 137/540 |

Primary Examiner—Samih N. Zaharna
Assistant Examiner—Robert G. Mukai
Attorney, Agent, or Firm—G. H. Telfer

[57] ABSTRACT

A strainer for removing foreign particles carried by a flow of pressurized lubricating fluid in a lubrication system of a large rotating apparatus. The strainer is comprised of a casing and a movable filter element disposed within the casing. The movable filter element is biased by a spring toward a normally sealed relationship between the movable filter element and the casing. The movable filter element is responsive to a pressure change in the influent fluid by moving from the normally closed position to a bypass position when the filter element becomes clogged with foreign particles. As the filter element moves away from the first position, a flange portion of the filter element is exposed to the pressures of the influent field, and assists the movement of the filter element toward the bypass position. A collection magnet is disposed within the movable filter element to collect any ferromagnetic materials carried by the pressurized fluid. The collection magnet cooperates with a second magnet disposed in the casing to assist the movement of the filter element to the bypass position and to secure it there. The magnets also cooperate with the pressure response of the movable filter element to assist the movement of the filter element to the bypass position. When the movable filter element occupies the bypass position, the lubricating fluid bypasses around the filter element, but continues to supply lubricant to the apparatus.

11 Claims, 5 Drawing Figures

PATENTED JUN 18 1974 3,817,380

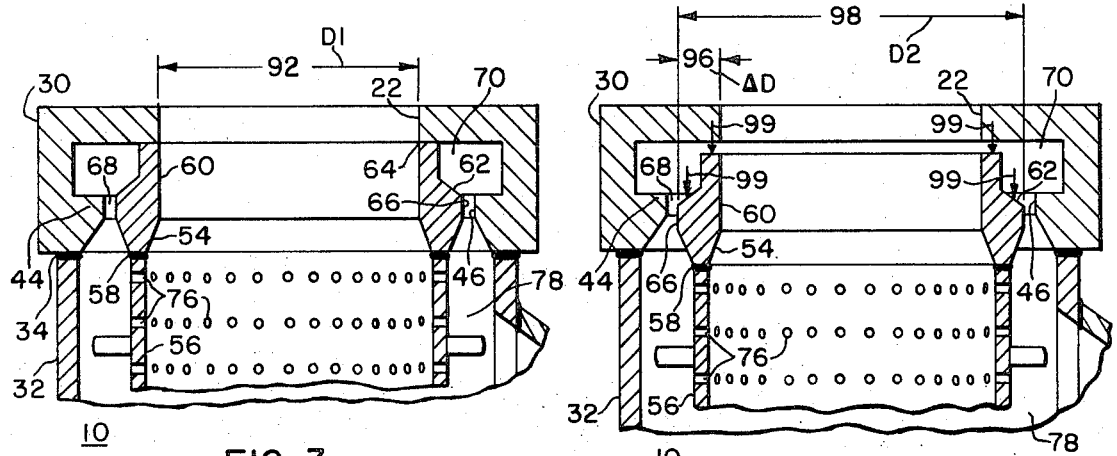
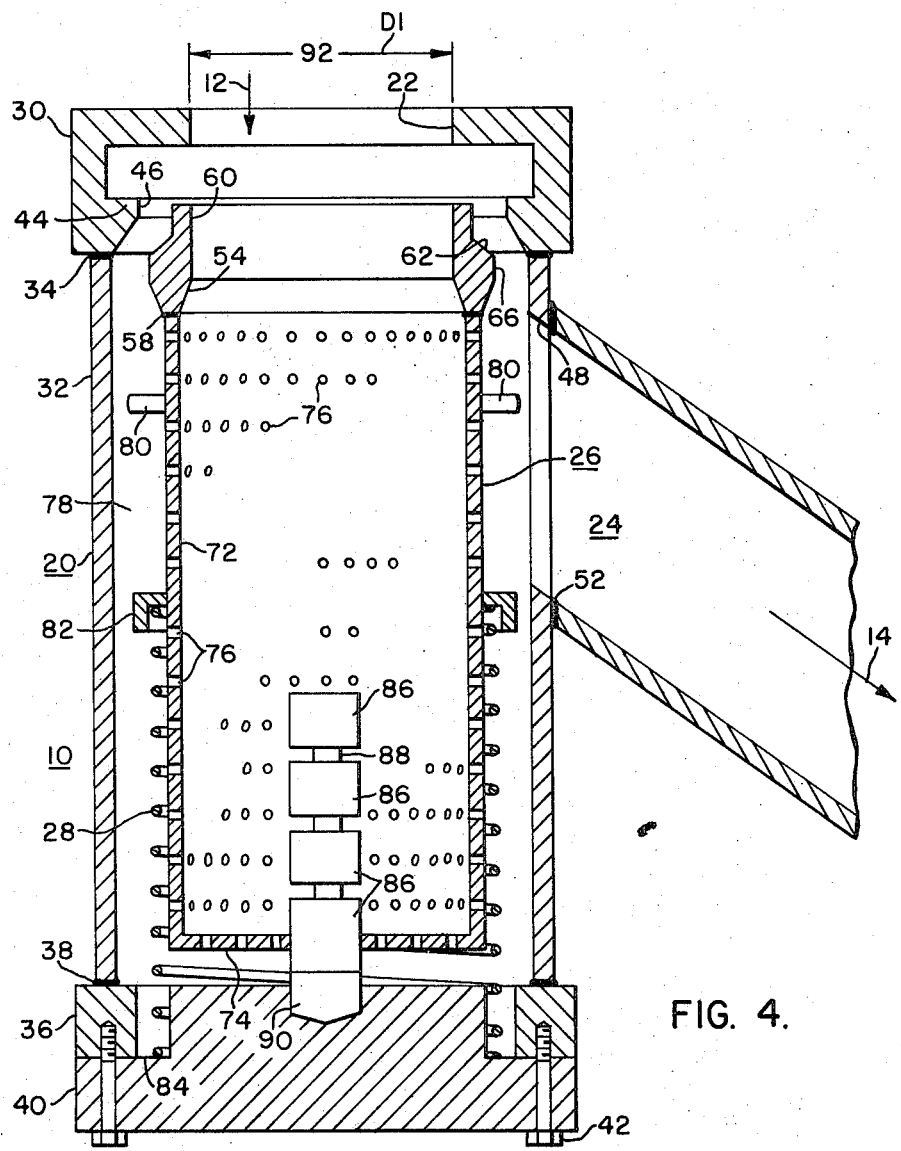

SAFETY OIL STRAINER

BACKGROUND OF THE INVENTION

1. Field of the Invention

This invention relates to a lubrication system for large rotating apparatus, and in particular, with an improved strainer for removing foreign particles carried by the pressurized lubricating fluid.

2. Description of the Prior Art

Foreign materials in the lubricating oil systems of large rotating apparatus, such as gas or steam turbines, can cause severe damage to the bearings and rotor journals over which the lubricating fluid passes. This material enters the system in the form of rust, scale, weld beads and other foreign materials that have been introduced before or during the erection of the unit.

The present methods used to clean the lubricating system before the operation of the unit consists primarily of flushing the piping with alternately warm and cold high-velocity oil in an effort to dislodge rust and scale and to flush foreign matter back to the lubricating fluid reservoir where it is removed by screens. This method is not entirely satisfactory in many units, since foreign matter is frequently dislodged during operation of the unit by vibration of the unit or expansion and contraction of the piping system. The foreign particles thus dislodged have not been filtered and thus create a danger of severe damage to the journals and bearings of the apparatus.

Prior art has solved the problem by disposing a strainer just ahead of each bearing or journal that is to be lubricated, but this solution has proven unsatisfactory since the strainer so disposed easily becomes clogged by the foreign particles collected in the strainer and causes a disruption of the oil flow to the bearing or journal, with the attendant possibility of severe damage to the unit when the disruption occurs.

SUMMARY OF THE INVENTION

This invention discloses an improved strainer located in the fluid lubricant supply before each journal or bearing to protect the journal or bearing from the damage that results when the foreign particles carried by the fluid lubricant enter the journal or bearing. The strainer is comprised of a casing and a movable filter element having openings therein. The filter element is normally biased by a spring toward a normally closed position wherein the filter element abuts the casing. The filter element has disposed within it a collection magnet to collect ferromagnetic particles which may be carried by the pressurized flow of fluid lubricant. As the filter element becomes clogged with foreign particles which have been screened from the fluid lubricant flow, the filter element responds to the pressure change in the influent fluid by moving from the normally closed position to a bypass position. As the filter element moves from the normally closed position, a flange portion of the filter element becomes exposed to the increased pressure of the influent fluid. Exposure of the flange portion of the filter element provides a larger operating surface upon which the pressure of the influent fluid can act and the increased forces of the inlet pressure assist movement of the filter element to the bypass position. A second magnet is disposed within the casing and cooperates with the collection magnet disposed within the filter element and both magnets also cooperate with the force exerted by the increased pressure against the flange portion to assist the movement of the filter element toward the bypass position. The magnet disposed within the casing also cooperates with the magnet disposed within the filter element to secure the filter element in the bypass position; thereby preventing oscillation of the filter element from its open to closed position with a resulting fluctuation in fluid pressure.

An object of this invention is to provide an improved strainer located in the fluid lubricant supply line at a point upstream from the bearing or journal that is to be lubricated. A further object of this invention is to provide a filter element with an increased filtering capacity. This invention provides a collection magnet disposed within the filter element to collect ferromagnetic particles carried by the fluid to increase the filtering capacity of the filter element by reducing the amount of foreign particles that could clog the openings in the filter element. A still further object of the invention is to provide a movable filter element that is responsive to the pressure increase of the influent fluid when the openings of the filter become clogged with foreign particles. This invention provides a filter element that responds to a pressure increase in the influent fluid by moving from a normally closed, first position to a bypass, second position, so that the fluid lubricant flow will not be impeded when the filter element is clogged, but allows the lubricant flow to bypass the filter element, thus insuring against damage to the bearings or journals caused by a termination of lubricant flow.

BRIEF DESCRIPTION OF THE DRAWINGS

The invention will be more fully understood from the following detailed description of an illustrative embodiment, taken in connection with the accompanying drawings, in which:

FIGS. 3 and 3A are diagrammatic views illustrating the operation of the strainer; and FIG. 4 is an elevational view of the strainer in the bypass second position.

DESCRIPTION OF THE PREFERRED EMBODIMENTS

Figure 1:
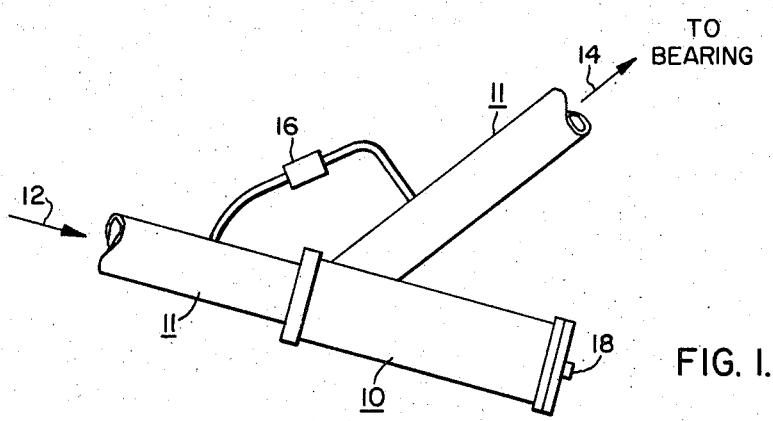
FIG. 1 is a diagrammatic view of a portion of a lubrication system, showing the location of the strainer in the fluid lubricant line.

Throughout the following description similar reference characters refer to similar elements in all figures of the drawings.

Referring now to the drawings and to FIG. 1 in particular, a diagrammatic view of a portion of a lubrication system showing the location of a strainer generally indicated by reference numeral 10 in a fluid lubricant line 11 is shown. The strainer 10 is disposed between the influent flow of fluid lubricant from the reservoir illustrated by arrow 12 and the effluent flow of filtered lubricant to the bearings or journal requiring lubrication illustrated by arrow 14. A pressure switch 16 is connected between the influent flow 12 and the effluent flow 14. The pressure switch 16 is calibrated so as to detect a predetermined pressure drop in the influent flow 12 and the effluent flow 14. When the pressure switch 16 detects the predetermined pressure drop, it will indicate to an external observer that the strainer is becoming clogged. A magnetic switch 18 signals an external observer that the strainer 10 is occupying the bypass position.

Figure 2:
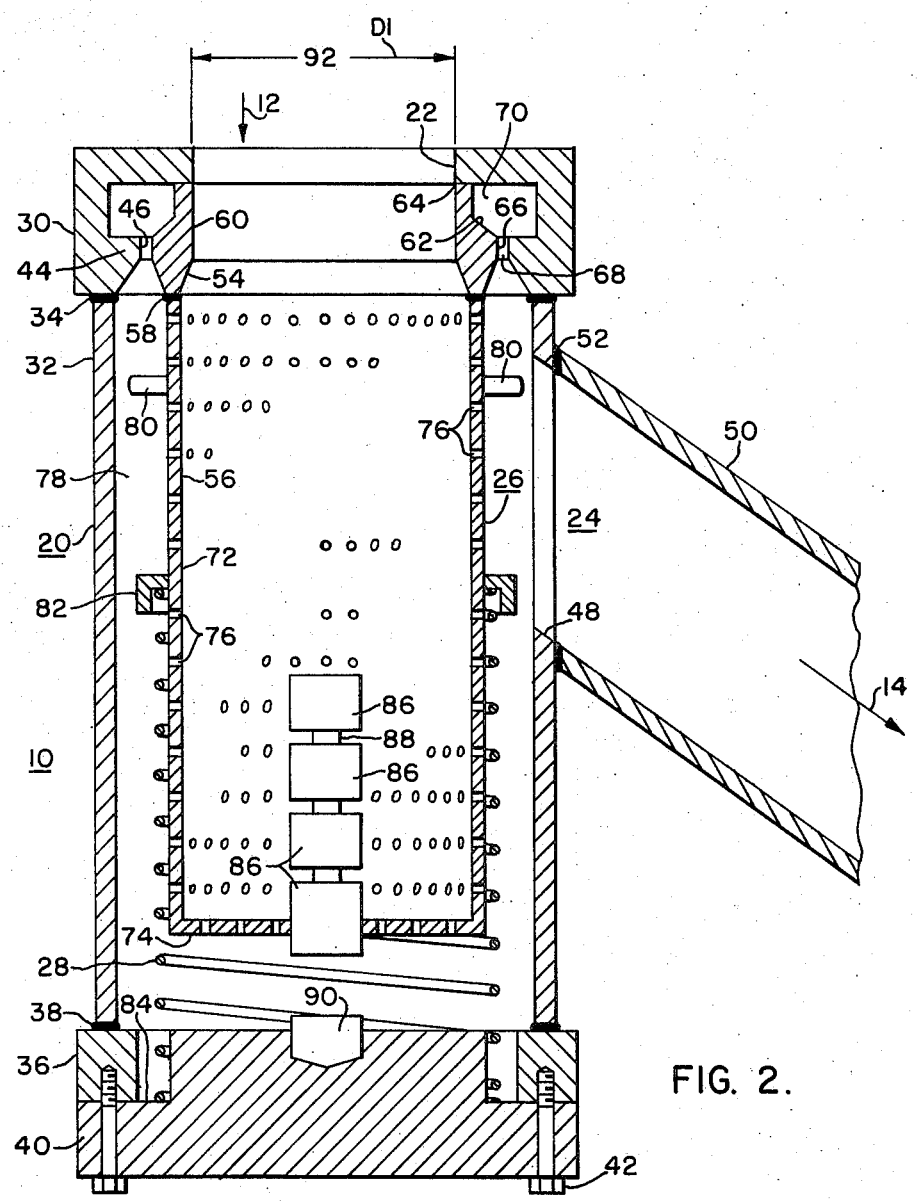
FIG. 2 is an elevational view of the strainer in the normally closed first position.

Referring now to FIG. 2 in particular, an elevational view of the strainer 10 in the normally closed first position is shown. The strainer 10 for removing foreign particles from a pressurized lubrication fluid is comprised of a casing 20 having an inlet port 22 and an outlet port 24 therein, a movable filter element 26 disposed within the casing 20 and a spring 28 for biasing the movable filter element 26 toward the normally closed first position.

The casing 20 is fabricated of any suitable material such as stainless steel or the like. The casing 20 is comprised of a top member 30 which defines the inlet port 22, a generally tubular member 32 which is attached to the top member 30 as illustrated by a weld bead 34, a bottom member 36 which is attached to the tubular member 32 as illustrated by a weld bead 38, and a removable member 40 which is attached to the bottom member 36 in a manner which facilitates removal of the removable member 40 from the bottom member 36 so as to permit ease of cleaning of the filter element 26. A bolt 42 passes through the removable member 40 and is threaded into the bottom member 36. However, it is to be understood that any method of attachment between the removable member 40 and the bottom member 36 that will permit easy removal of the removable member 40 is within the contemplation of the invention. The interior of the top member 30 has a flange portion 44 extending circumferentially about the interior of the top member 30. The flange portion 44 has a short, axially extending, cylindrical surface 46 extending about the interior of the top member 30. An opening 48 in the tubular member 32 of the casing 20 defines the outlet port 24. An outlet pipe 50, fabricated of stainless steel, is attached about the periphery of the opening 48 in the tubular member 32 by any suitable means of attachment, as illustrated by a weld bead 52. The influent flow 12 enters the strainer 10 through the inlet port 22, while the effluent flow 14 leaves the strainer 10 through the outlet port 24. The outlet pipe 50 carries the flow of lubricating fluid toward the journal or bearing which it lubricates.

The movable filter element 26 is fabricated of stainless steel and is comprised of a flange portion 54 attached to a tubular member 56. The flange portion 54 is attached to the tubular member 56 by any suitable means, illustrated by a weld bead 58. The flange portion 54 has a collar portion 60 thereon and a frustoconical surface area 62 extending about the exterior of flange portion 54. The collar member 60 abuts the top member 30 of the casing 20, as illustrated in the drawings by reference numeral 64. When the movable filter element 26 occupies the normally closed first position, the sealed realtionship 64 between the collar portion 60 of the flange 54 and the top member 30 of the casing 20 is maintained. Thus, when the movable filter element 26 occupies the normally closed first position, the sealed realtionship 64 prevents any exposure of the surface area 62 of the flange 54 to the pressurized flow of influent fluid lubricant 12 entering the strainer 10 through the inlet port 22. The flange 54 has a cylindrical surface 66 extending about the exterior of the flange 54. The cylindrical surface 66 on the exterior of the flange 54 is disposed so as to align axially with the cylindrical surface 46 which extends about the interior of the top member 30 of the casing 20. The alignment of the cylindrical surface 46 and the cylindrical surface 66 defines an orifice 68 which extends about the interior of the strainer 10. A first annular space 70 is defined by the interior of the top member 30, the exterior surface of the collar 60, and the frustoconical surface 62 of the flange 54.

The tubular member 56 of the movable filter element 26 has a generally cylindrical side portion 72 and a bottom portion 74 which is integral with the side portion 72. A plurality of openings 76 extend through the side portion 72 and the bottom portion 74 of the tubular member 56. The opening 76 filter any non-ferromagnetic particles carried by the pressurized lubricating fluid. A second annular space 78 is defined by the tubular member 30 and the bottom member 36 of the casing 20 and the tubular member 56 of the movable filter element 26. The second annular space 78 completely surrounds the tubular member 56 of the movable filter element 26. The second annular space 78 also communicates with the interior of the outlet pipe 50 adjacent the outlet port 24. The second annular space 78 also communicates with the first annular space 70 through the orifice 68. A series of aligning lugs 80 are disposed on the external surface of the side portion 72 of the tubular member 56 of the movable filter element 26. The object of the aligning lugs 80 is to keep the side portion 72 of the tubular portion 56 of the movable filter element 26 in alignment with respect to the tubular member 32 of the casing 20. A spring keeper 82 extends about the exterior of the side portion 72 of the tubular portion 56 of the movable filter element 26.

The spring 28 which biases the movable filter element 26 toward the normally closed first position is a compression spring which is engaged at one end thereof by the spring keeper 82 which extends about the exterior of the tubular member 56 of the filter element 26 and at the other end lies against a flat portion of the removable flange 40 of the casing 20, illustrated by numeral 84. The purpose for the spring 28 is to bias the movable filter element 26 toward the normally closed first position in which the sealed relationship 64 between the collar 60 of the flange 54 and the top member 30 of the casing 20 is maintained.

A plurality of collection magnets 86 are disposed on the interior of the movable filter element 26. The collection magnets 86 are mounted upon a mounting member 88. The purpose of the collection magnets 86 is to attract any ferromagnetic materials which are carried in the pressurized lubricating fluid so as to provide a greater filtering capacity of the strainer 10. A securing magnet 90 is coaxially disposed in the removable member 40 of the casing 20. The collection magnets 86 and the securing magnet 90 are so disposed so that a force of attraction between the magnets exists between them. The securing magnet 90 is adjustably disposed in the removable member 40. The purpose of the securing magnet 90 is twofold. First, it serves to secure the movable filter element 26 in the bypass second position which is more fully discussed in conjunction with FIG. 4. Secondly, the force of attraction between the collection magnets 86 and the securing magnet 90 cooperate in a manner to be discussed more fully herein with the pressure response of the movable filter element 26, so as to assist the movement of the filter element 26 toward the bypass second position. The securing magnet 90 can be adjusted relative to the collection magnet 86 to provide the optimum relative distance between them.

Under normal operating conditions, the spring 28 exerts a force on the movable filter element 26 so as to maintain the movable filter element in the normally closed first position in which the sealed relationship 64 between the collar 60 of the movable filter element 26 and the top member 30 of the casing 20 is intact. When the sealed relationship 64 is maintained, the influent flow of pressurized fluid 12 enters the strainer 10 at the inlet port 22. Any ferromagnetic particles carried by the flow of pressurized lubricating fluid are attracted to and collected by the plurality of collection magnets 86 disposed within the movable filter element 26. Any nonferromagnetic particles carried by the lubricating fluid are prohibited from passing through the movable filter element 26 by the plurality of openings 76 in the movable filter element 26. Thus, pressurized lubricating fluid entering through the inlet port 22 is compelled to pass through the strainer 10 and the fluid exits the strainer 10 through the outlet port 24 having the foreign particles removed therefrom, so that strainer 10 effectively removes any foreign particles from the pressurized flow of lubricant which, if allowed to pass unfiltered, would severely damage the bearing or journal.

However, when the strainer 10 becomes clogged with the foreign particles removed from the pressurized fluid, the pressure drop between the influent flow 12 and the effluent flow 14 increases. If the increased pressure drop exceeds the predetermined threshold value, the pressure switch 16 (FIG. 1) becomes operable and indicates to an external observer that the pressure drop is increasing.

As long as the sealed relationship 64 between the collar 60 and the casing 20 is maintained, the pressure of the influent fluid 12 will act over a diameter D1, indicated by reference numeral 92 in FIG. 2. However, when the change in pressure between the fluid at the inlet port 22 and the outlet port 24 reaches a predetermined value, the force exerted on the movable filter element 26 caused by the pressurized fluid acting over diameter 92 will become sufficient to overcome the force exerted by the spring 28 on the movable element 26. When this imbalance in forces occurs, the movable filter element 26 will be impelled away from the normally closed first position evidenced by the sealed relationship 64 and the sealed relationship 64 will be broken. The movable filter element 26 responds to the increase of pressure of the pressurized fluid at the inlet port 22 by moving from the normally closed first position evidenced by the sealed relationship 64.

FIGS. 3 and 3A, illustrate the operation of the strainer 10. The FIGS. 3 and 3A illustrate a comparison of the situation just before the sealed relationship 64 is broken and just after the sealed relationship 64 is broken. FIG. 3 depicts the situation extant immediately before the seal 64 is broken, while FIG. 3A illustrates the reactions immediately after the seal 64 is broken.

Referring now to FIG. 3A, as the force exerted by the pressurized fluid at the inlet port 22 overcomes the forces exerted by the spring 28, the sealed relationship 64, as shown in FIG. 3, is broken and the frustoconical surface area 62 of flange 54 becomes exposed to the pressure of the lubricating fluid at the inlet port 22. The effective surface area over which the fluid pressure can act increases by an amount of twice ΔD (numeral 96), so that the force of the pressurized fluid at the inlet port 22 acts over a diameter D2, indicated by the reference numeral 98. Thus, the fluid pressure reacts on the newly exposed surfaces as indicated by arrows 99.

A further force acts on frustoconical surface area 62 of flange 54 due to the pressure drop from the first annular space 70 through orifice 68 to the second space 78. This added impetus is required to overcome the inertial effects of the movable filter element 26 and helps move the movable filter element 26 toward the bypass second position.

In addition to the increased force exerted by the pressurized fluid, the attractive force between the collection magnets 86 and the securing magnets 90 cooperates with the force of the pressurized fluid, the resultant force of the combination of the magnetic attractive force and the force of the pressurized fluid being sufficient to overcome the spring 28.

Referring now to FIG. 4, the strainer 10 is illustrated in the bypass second position. The attractive force between the collection magnets 86 and the securing magnets 90 is sufficient to overcome the force exerted by the spring 28, and the movable filter element 26 is secured in the bypass second position. The attraction between the magnets insures that the movable filter element 26 will remain in the bypass second position and that no oscillation of the movable filter element 26 will occur. In the bypass second position, the flow of fluid lubricant can pass directly through the inlet port 22, through the first and second annular spaces 70 and 78, respectively, and through the outlet port 24 and into the outlet pipe 50 without having to pass through the movable filter element 26. This insures that the bearings or journal which require lubrication will not experience a diminution in the amount of lubricating fluid received, even though the filter element 26 is rendered inpassable due to clogging by foreign particles.

Referring again to FIG. 1, when the movable filter element 26 is in the bypass second position, the magnetic switch 18 becomes operable and indicates to an external observer that the filter element 26 is clogged. The movable filter element can be easily cleaned by removing the removable member 40 of the casing 20.

In summary, the use of the strainer disclosed by this invention provides an efficient method of removing both ferromagnetic and non-ferromagnetic foreign particles that are carried in the fluid lubricant flow and prevents such particles from reaching the journals or bearings which the flow lubricates. Also, the movable filter element has the capability to provide an efficient bypass when the strainer becomes clogged with the particles.

I claim as my invention:

1. A strainer for removing foreign particles from a pressurized fluid, said strainer comprising:

a casing having an inlet port and an outlet port therein;

a filter element movable between a first and a second position within said casing, said filter element having openings therein, said filter element moving from the first position toward the second position in response to the pressure of the fluid adjacent the inlet port when the openings of said filter element are clogged with foreign particles;

means for biasing said filter element toward the first position; and, magnetic means for securing said filter element in the second position, said magnetic means comprising a magnet disposed in said casing.

2. The strainer of claim 1, wherein said filter element has a flange portion, said flange portion having a collar portion thereon, said collar portion forming a sealed relationship with said casing when said filter element occupies the first position, said flange portion being exposed to the pressure of the fluid at the inlet port when the sealed relationship between said collar portion and said casing is broken as said filter element moves away from the first position in response to the pressure of the fluid at the inlet port when the openings of said filter element become clogged with foreign particles, the exposure of said flange portion to the pressure of the fluid at the inlet port thereby moving said filter element toward the second position.

3. The strainer of claim 1 further comprising magnetic means for collecting ferromagnetic particles carried by the pressurized fluid.

4. The strainer of claim 3, wherein said magnetic means for collecting ferromagnetic particles carried by the pressurized fluid are disposed within said filter element.

5. A strainer for removing foreign particles from a pressurized fluid, said strainer comprising:
 a casing having an inlet port and an outlet port therein;
 a filter element movable between a first and a second position within said casing, said filter element having openings therein, said filter element moving from the first position toward the second position in response to the pressure of the fluid adjacent the inlet port when the openings of said filter element are clogged with foreign particles;
 means for biasing said filter element toward the first position; and,
 magnetic means for assisting said filter element toward the second position.

6. The strainer of claim 5 wherein said magnetic means for assisting said filter element toward the second position are disposed within said casing.

7. The strainer of claim 5, further comprising:
 magnetic means for collecting ferromagnetic particles carried by the pressurized fluid; and,
 magnetic means for securing said filter element in the second position.

8. The strainer of claim 7, wherein
 said magnetic means for collecting ferromagnetic materials carried by the pressurized fluid comprises a first magnet disposed within said filter element;
 said magnetic means for securing said filter element in the second position comprises a second magnet disposed within said casing, said second magnet cooperating with said first magnet to assist the movement of said filter element toward the second position.

9. The strainer of claim 5, wherein said means for biasing said filter element toward the second position comprises a spring.

10. A strainer for removing foreign particles from a pressurized fluid, said strainer comprising:
 a casing having an inlet port and an outlet port therein;
 a filter element movable between a first and a second position within said casing, said filter element having openings therein, said filter element moving from the first position toward the second position in response to the pressure of the fluid adjacent the inlet port when the openings in said filter element are clogged with foreign particles;
 means for biasing said filter element toward the first position,
 first magnetic means for collecting ferromagnetic particles carried by the pressurized fluid, said first magnetic means being disposed within said filter element; and
 second magnetic means disposed in said casing for cooperating with said first magnetic means to assist the movement of said filter element toward the second position and for securing said filter element in the second position.

11. The strainer of claim 10, wherein said filter element has a flange, said flange having a collar portion thereon, said collar portion forming a sealed relationship with said casing when said filter element occupies the first position, said flange portion being exposed to the pressure of the fluid at the inlet port when the sealed relationship between said collar portion and said casing is broken as said filter element moves away from the first position in response to the pressure of the fluid at the inlet port when the openings of said filter element become clogged with foreign particles, the exposure of said flange portion to the pressure of the fluid at the inlet port thereby assisting and cooperating with said first and second magnetic means to move said filter element toward the second position, said first magnetic means and said second magnetic means cooperating to secure said filter element in the second position, thereby permitting the pressurized fluid to bypass said filter element.

* * * * *